(12) United States Patent
Tang

(10) Patent No.: US 11,071,154 B2
(45) Date of Patent: Jul. 20, 2021

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/626,753

(22) PCT Filed: Sep. 22, 2017

(86) PCT No.: PCT/CN2017/103029
§ 371 (c)(1),
(2) Date: Dec. 26, 2019

(87) PCT Pub. No.: WO2019/056330
PCT Pub. Date: Mar. 28, 2019

(65) Prior Publication Data
US 2020/0137811 A1  Apr. 30, 2020

(51) Int. Cl.
*H04W 76/27* (2018.01)
*H04W 76/11* (2018.01)
(Continued)

(52) U.S. Cl.
CPC ........... *H04W 76/11* (2018.02); *H04L 1/0026* (2013.01); *H04L 5/0057* (2013.01);
(Continued)

(58) Field of Classification Search
CPC . H04W 76/11; H04W 76/27; H04W 28/0263; H04W 28/0268; H04L 1/0026; H04L 5/0057
See application file for complete search history.

(56) References Cited

U.S. PATENT DOCUMENTS

2014/0233380 A1* 8/2014 Kim .................. H04L 47/24
370/230
2018/0192426 A1* 7/2018 Ryoo ................. H04W 72/085
(Continued)

FOREIGN PATENT DOCUMENTS

CN  103096314  5/2013
WO  2013062363  5/2013

OTHER PUBLICATIONS

Precedence of the RRC configured mapping and reflective QoS, R2-1706853, Jun. 2017.*
(Continued)

*Primary Examiner* — Lakeram Jangbahadur
(74) *Attorney, Agent, or Firm* — Hodgson Russ LLP

(57) ABSTRACT

Embodiments of the present disclosure relate to a data transmission method, a terminal device, and a network device. The method comprises: receiving a first downlink data packet sent by a network device, the first downlink data packet comprising a first RQI that is a first preset value; keeping, according to the first preset value, a mapping rule of a first mapping relationship and a mapping rule of a second mapping relationship to be both unchanged, and receiving an RRC message sent by the network device, the first mapping relationship being a mapping relationship from IP flows to QoS flows, the second mapping relationship being a mapping relationship from QoS flows to DRBs, and the RRC message comprising a target mapping rule; and determining, according to the RRC message, the mapping
(Continued)

rule of the second mapping relationship, as the target mapping rule.

12 Claims, 4 Drawing Sheets

(51) Int. Cl.
    *H04L 1/00*     (2006.01)
    *H04L 5/00*     (2006.01)
    *H04W 28/02*     (2009.01)

(52) U.S. Cl.
    CPC ... *H04W 28/0263* (2013.01); *H04W 28/0268* (2013.01); *H04W 76/27* (2018.02)

(56) References Cited

U.S. PATENT DOCUMENTS

2019/0029057 A1*   1/2019   Pan ..................... H04W 28/12
2020/0100136 A1*   3/2020   Chang ................. H04W 28/24

OTHER PUBLICATIONS

CATT, "How to update the mapping rule of reflective QoS," 3GPP TSG-RAN WG2 #99, R2-1707938, Aug. 2017, 4 pages.
Ericsson, "QoS Flow Remapping Within the Same Cell and in Handover," 3GPP TSG-RAN WG2 #98-AH, Tdoc R2-1707161, Jun. 2017, 6 pages.
Ericsson, "SDAP Header Format," 3GPP TSG-RAN WG2 #99, R2-1708324, Aug. 2017, 4 pages.
Huawei et al., "SDAP Header Format," 3GPP TSG-RAN WG2 #99 Meeting, R2-1708932, Aug. 2017, 5 pages.
ZTE, "Discussion on the Reflective QoS and QoS related IEs over NG-C," 3GPP TSG-RAN WG3 NR AdHoc, R3-172368, Jun. 2017, 4 pages.
WIPO, ISR for PCT/CN2017/103029, dated May 30, 2018.
EPO, Office Action for EP Application No. 17925825.6, dated May 27, 2020.
Huawei et al., "Activation and Deactivation of Reflective QoS," 3GPP TSG-RAN WG2 Meeting #98, R2-1704985, May 2017, 3 pages.
LG Electronics Inc., "Precedence of the RRC configured mapping and reflective QoS," 3GPP TSG-RAN WG2 NR Ad Hoc, R2-1706853, Jun. 2017, 4 pages.
OPPO, "Discussion on reflective QoS," 3GPP TSG-RAN2 #98, R2-1704059, May 2017, 4 pages.
ZTE, "Discussion on reflective QoS," 3GPP TSG RAN WG2#NR_AdHoc#2, R2-1706668 (Revision of R2-1704647), Jun. 2017, 4 pages.
SIPO, First Office Action for CN Application No. 201780090334.4, dated Apr. 29, 2020.
IPI, Office Action for IN Application No. 201917054306, dated Mar. 24, 2021.

\* cited by examiner

200

```
┌─────────────────────────────────────────┐
│ A second downlink data packet is sent to a │
│ terminal device, the second downlink data packet │
│ including a second RQI that is a second preset │
│ value, the second preset value being used to │
│ indicate the terminal device to activate a first │      S210
│ reflective QoS to update a first mapping │
│ relationship, and activate a second reflective QoS │
│ to update a second mapping relationship │
└─────────────────────────────────────────┘
                    │
┌─────────────────────────────────────────┐
│ The second uplink data packet sent by the │      S220
│ terminal device is received │
└─────────────────────────────────────────┘
                    │
┌─────────────────────────────────────────┐
│ A first downlink data packet and a RRC message │
│ are sent to the terminal device, after determining │
│ the first mapping relationship of the second │
│ uplink data packet is correct, the first downlink │
│ data packet including a first RQI that is a first │
│ preset value, the first preset value being used to │
│ indicate that the terminal device keeps an │      S230
│ activation state of the first reflective QoS, the │
│ RRC message including a target mapping rule, │
│ and being used to indicate that the terminal device │
│ determines the mapping rule of the second │
│ mapping relationship as the target mapping rules │
└─────────────────────────────────────────┘
```

FIG. 2

DATA TRANSMISSION METHOD, TERMINAL DEVICE, AND NETWORK DEVICE

CROSS-REFERENCE TO RELATED APPLICATION

This application is a U.S. national phase application of International Application No. PCT/CN2017/103029, filed Sep. 22, 2017, the entire disclosure of which is incorporated herein by reference.

TECHNICAL FIELD

Embodiments of the present disclosure relate to the field of communication, and more particularly, to a data transmission method, a terminal device, and a network device.

BACKGROUND

Quality of service (QoS) mapping relationship of the fifth generation (5G) system, namely, new radio (NR), can include two parts: non-access stratum (NAS) mapping and access stratum (AS) mapping, wherein the NAS mapping can represent mapping from the internet protocol (IP) flow to the QoS flow, and the AS mapping can represent mapping from the QoS flow to the data radio bearer (DRB).

In the 3rd generation partnership project (3GPP), it is stipulated that the reflective QoS indication (RQI) of one bit can be used to indicate the activation and deactivation of the NAS reflective QoS and the AS reflective QoS, that is, when the RQI in the service data adaptation protocol (SDAP) packet header received by a user experience (UE) is "1", a state of the mapping rule of the NAS reflective QoS and the AS reflective QoS is simultaneously detected and updated by the UE, and the NAS reflective QoS and the AS reflective QoS are activated.

SUMMARY

The present disclosure provides a data transmission method, a terminal device, and a network device.

In a first aspect, a data transmission method is provided, including: receiving a first downlink data packet sent by a network device, the first downlink data packet including a first RQI that is a first preset value; keeping, according to the first preset value, a mapping rule of a first mapping relationship and a mapping rule of a second mapping relationship to be both unchanged, and receiving an radio resource control (RRC) message sent by the network device, the first mapping relationship being a mapping relationship from IP flows to QoS flows, the second mapping relationship being a mapping relationship from QoS flows to DRBs, and the RRC message including a target mapping rule; and determining, according to the RRC message, the mapping rule of the second mapping relationship, as the target mapping rule.

In conjunction with the first aspect, in one implementation manner of the first aspect, before receiving a first RQI sent by a network device, the method further includes: receiving a second downlink data packet sent by the network device, the second downlink data packet including a second RQI that is a second preset value; according to the second preset value, activating a first reflective QoS to update the first mapping relationship, and activating a second reflective QoS to update the second mapping relationship, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; sending the second uplink data packet to the network device; keeping, according to the first preset value, a mapping rule of a first mapping relationship and a mapping rule of a second mapping relationship to be both unchanged, includes keeping an activation state of the first reflective QoS, and an activation state of the second reflective QoS.

In conjunction with the first aspect and the foregoing implementation manner, in another implementation manner of the first aspect, after determining, according to the RRC message, the mapping rule of the second mapping relationship, as the target mapping rule, the method further includes determining the first mapping relationship of the first downlink data packet as the first mapping relationship of a first uplink data packet according to the first reflective QoS, and determining the second mapping relationship of the first uplink data packet according to the target mapping rule; and sending the first uplink data packet to the network device.

In conjunction with the first aspect and the foregoing implementation manners, in another implementation manner of the first aspect, the target mapping rule is consistent with an updated mapping rule of the second mapping relationship.

In a second aspect, a data transmission method is provided, including: sending a second downlink data packet to a terminal device, the second downlink data packet including a second RQI that is a second preset value, the second preset value being used to indicate that the terminal device activates a first reflective QoS to update a first mapping relationship, and activates a second reflective QoS to update a second mapping relationship, the first mapping relationship being a mapping relationship from IP flows to QoS flows, the second mapping relationship being a mapping relationship from QoS flows to DRBs, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; receiving the second uplink data packet sent by the terminal device; and sending a first downlink data packet and an RRC message to the terminal device, after determining the first mapping relationship of the second uplink data packet is correct, the first downlink data packet including a first RQI that is a first preset value, the first preset value being used to indicate that the terminal device keeps an activation state of the first reflective QoS, the RRC message including a target mapping rule, and being used to indicate that the terminal device determines the mapping rule of the second mapping relationship as the target mapping rules.

In conjunction with the second aspect, in an implementation manner of the second aspect, after sending a first downlink data packet and an RRC message to the terminal device, the method further includes: receiving the first uplink data packet sent by the terminal device, the first mapping relationship of the first uplink data packet being determined by the terminal device according to the first reflective QoS, and the second mapping relationship of the first uplink data packet being determined by the terminal device according to the target rule.

In conjunction with the second aspect and the foregoing implementation manner, in another implementation manner of the second aspect, the target mapping rule is consistent with an updated mapping rule of the second mapping relationship.

In a third aspect, a terminal device is provided, configured to perform the method in the first aspect or any optional implementation manner of the first aspect described above. In particular, the terminal device may include units for performing the method in the first aspect or any optional implementation manner of the first aspect described above.

In a fourth aspect, a network device is provided, configured to perform the method in the second aspect or any optional implementation manner of the second aspect described above. In particular, the network device may include units for performing the method in the second aspect or any optional implementation manner of the second aspect described above.

In a fifth aspect, a terminal device is provided, including: a storage unit and a processor, wherein the storage unit is configured to store instructions, the processor is configured to execute the instructions stored by the storage unit. When the processor executes the instructions stored in the storage unit, the execution causes the processor to perform the methods in the first aspect or any possible implementation manner of the first aspect.

In a sixth aspect, a network device is provided, including: a storage unit and a processor, wherein the storage unit is configured to store instructions, the processor is configured to execute the instructions stored by the storage unit. When the processor executes the instructions stored in the storage unit, the execution causes the processor to perform the methods in the second aspect or any possible implementation manner of the second aspect.

In a seventh aspect, a computer-readable medium is provided for storing a computer program, the computer program including instructions for performing the method in the first aspect or any possible implementation manner of the first aspect.

In an eighth aspect, a computer-readable medium is provided for storing a computer program, the computer program including instructions for performing the method in the second aspect or any possible implementation manner of the second aspect.

In a ninth aspect, a computer program product including instructions is provided, wherein when a computer runs the instructions of the computer program product, the computer performs the method in the first aspect or any possible implementation manner of the first aspect. In particular, the computer program product can be run on the terminal device of the above third aspect.

In a tenth aspect, a computer program product including instructions is provided, wherein when a computer runs the instructions of the computer program product, the computer performs the method in the second aspect or any possible implementation manner of the second aspect. In particular, the computer program product can be run on the terminal device of the above fourth aspect.

BRIEF DESCRIPTION OF THE DRAWINGS

FIG. 2 is another schematic flowchart of a data transmission method according to an embodiment of the present disclosure.

DETAILED DESCRIPTION

The technical solutions in the embodiments of the present disclosure will be described below with reference to the accompanying drawings.

It should be understood that the technical solutions of the embodiments of the present disclosure can be applied to various communication systems, such as a global system of mobile communication (GSMC) system, a code division multiple access (CDMA) system, and a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS), a worldwide interoperability for microwave access (WiMAX) communication system, and a future 5G (NR) communication system.

A terminal device in the embodiment of the present disclosure may be referred to as a user equipment, an access terminal, a subscriber unit, a subscriber station, a mobile station, mobile equipment, a remote station, a remote terminal, a mobile device, a user terminal, a terminal, a wireless communication device, a user agent, or a user device. The terminal device may be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a future evolutional public land mobile network (PLMN), etc., which is not limited by the embodiment of the present disclosure.

A network device in the embodiment of the present disclosure may be a device for communicating with the terminal device. The network device may be a base transceiver station (BTS) in the GSM system or the CDMA system, or a node base (NodeB, NB) in the WCDMA system, or an evolutional node base (eNB or eNodeB) in the LTE system, or a wireless controller in a cloud radio access network (CRAN), or the network device may be a relay station, an access point, an in-vehicle device, a wearable device, and a network side device in a future 5G network or a network side device in a future evolutional PLMN network, etc., which is not limited by the embodiment of the present disclosure.

Figure 1:
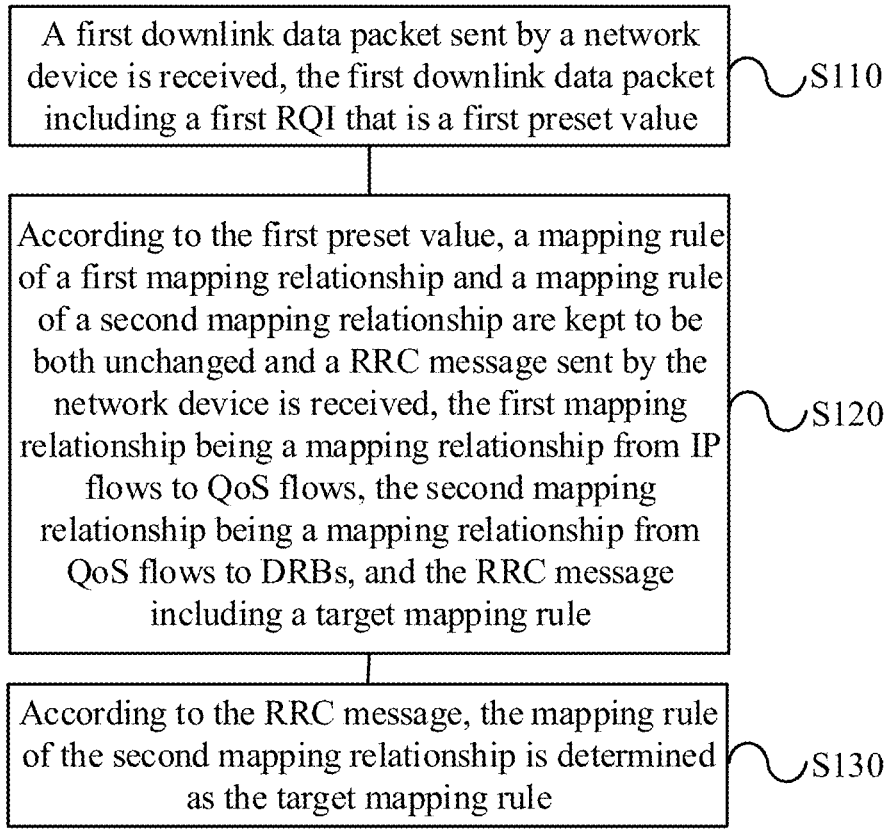
FIG. 1 is a schematic flowchart of a data transmission method according to an embodiment of the present disclosure.

FIG. 1 shows a schematic flow diagram of a data transmission method 100 according to an embodiment of the present disclosure. The method 100 may be performed by a terminal device. As shown in FIG. 1, the method 100 includes: in S110, a first downlink data packet sent by a network device is received, the first downlink data packet including a first RQI that is a first preset value; in S120, according to the first preset value, a mapping rule of a first mapping relationship and a mapping rule of a second mapping relationship are kept to be both unchanged and an radio resource control (RRC) message sent by the network device is received, the first mapping relationship being a mapping relationship from IP flows to QoS flows, the second mapping relationship being a mapping relationship from QoS flows to DRBs, and the RRC message including a target mapping rule; and in S130, according to the RRC message, the mapping rule of the second mapping relationship is determined as the target mapping rule.

Specifically, the terminal device receives the first downlink data packet sent by the network device, wherein the first RQI included in the first downlink data packet is a first preset value, for example, the first RQI may occupy 1 bit, and the first preset value is "0", and the terminal device does not perform the update of the first mapping relationship and the second mapping relationship, that is, does not change the mapping rule currently followed by the first mapping relationship and the second mapping relationship.

It should be understood that the first mapping relationship may be a NAS mapping, that is, the first mapping relationship may indicate that the IP flow is mapped to the QoS flow, and the second mapping relationship may be an AS mapping, that is, the second mapping relationship may represent that the QoS flow is mapped to the DRB. Specifically, the first mapping relationship indicates that the IP flow is mapped to the QoS flow. For the first mapping relationship of any data packet, the specific correspondence between each IP flow and each QoS flow in the data packet may be determined according to a mapping rule that is satisfied by the first mapping relationship, in the same manner, according to the mapping rule that the second mapping relationship of the data packet satisfies, the specific correspondence between each QoS flow and each DRB in the data packet may also be determined.

Specifically, the first mapping relationship and the second mapping relationship may be mapped according to a certain mapping rule. For example, the first mapping relationship and the second mapping relationship may follow the reflective QoS, that is, the first mapping relationship and the second mapping relationship of the downlink data packet can be determined, and the first mapping relationship and the second mapping relationship of the downlink data packet are respectively determined as a first mapping relationship and a second mapping relationship of the uplink data packet. Optionally, if the first mapping relationship and/or the second mapping relationship follow the reflective QoS, that is, the first reflective QoS is in an activation state, and/or the second reflective QoS is in an activation state, otherwise, the first reflective QoS and the second reflective QoS is in a deactivation state.

Optionally, when the first RQI is the first preset value, the terminal device does not update the first mapping relationship and the second mapping relationship, that is, keeps the current mapping rule of the first mapping relationship and the second mapping relationship to be unchanged. The first reflective QoS and the second reflective QoS of the terminal device are both in deactivation states.

In the embodiment of the present disclosure, after the terminal device determines that the first RQI is the first preset value, and keeps the first mapping relationship and the second mapping relationship from being updated, the terminal device further receives the RRC message sent by the network device, the RRC message including a target mapping rule, and the terminal device updates the second mapping relationship according to the target mapping rule in the RRC message.

Optionally, as one embodiment, before receiving a first downlink data packet sent by a network device in S110 of the method 100, the method 100 further includes: receiving, by the terminal device, a second downlink data packet sent by the network device, the second downlink data packet including a second RQI that is a second preset value. For example, the second RQI may occupy 1 bit, and the second preset value may be "1", and the terminal device activates the first reflective QoS and the second reflective QoS to perform the update of the first mapping relationship and the second mapping relationship.

Further, a second uplink data packet is determined by the terminal device, according to the updated first mapping relationship and the second mapping relationship. Specifically, according to the activation state of the first reflective QoS and the activation state of the second reflective QoS, the terminal device determines the first mapping relationship and the second mapping relationship of the second downlink data packet, activates the first reflective QoS, and determines the first mapping relationship of the second downlink data packet as the first mapping relationship of the second uplink data packet, activates the first reflective QoS, and determines the second mapping relationship of the second downlink data packet as the second mapping relationship of the second uplink data packet, and then sends the second uplink data packet to the network device.

The network device receives the second uplink data packet, and determines that the second uplink data packet can be mapped to the correct QoS flow, that is, the first mapping relationship of the second uplink data packet from the IP flow to the QoS flow is correct, then the first downlink data packet can be sent to the terminal device. The first RQI included in the first downlink data packet is a first preset value, and the terminal device is indicated that the mapping rule of the first mapping relationship is unchanged through the first RQI.

Optionally, for the second mapping relationship of the second uplink data packet received by the network device, if the second mapping relationship is also correct, the RRC message sent by the network device to the terminal device includes the target mapping rule of the second mapping relationship. The terminal device may update the second mapping relationship according to the target mapping rule in the RRC message, and it is ensured that the updated second mapping relationship is still consistent with the second mapping relationship obtained by performing activating the reflective QoS and updating the second mapping relationship according to the second RQI; if the second mapping relationship is incorrect, the network device may determine the correct mapping rule, and the network device may send the RRC message to the terminal device, and the target mapping rule of the second mapping relationship included in the RRC message may be the correct mapping rule, so that the terminal device updates the mapping rule of the second mapping relationship to the correct mapping rule according to the RRC message.

Optionally, as one embodiment, after the terminal device determines the mapping rule of the first mapping relationship and the second mapping relationship, according to the first RQI and the RRC message in the first downlink data packet, the terminal device determines the first mapping relationship and the second mapping relationship of the first uplink data, and sends the first uplink data to the network device.

Therefore, in the data transmission method of the embodiment of the present disclosure, the terminal device determines whether the first mapping relationship and the second mapping relationship respectively follow the reflective QoS by receiving the RQI and the RRC message sent by the network device, thereby flexibly configuring the mapping rule of the first mapping relationship and the mapping rule of the second mapping relationship, and making the states of the reflective QoS of the first mapping relationship and the second mapping relationship relatively independent.

The data transmission method according to the embodiment of the present disclosure is described in detail from the perspective of the terminal device with reference to FIG. 1, and the data transmission method according to the embodiment of the present disclosure is described from the perspective of the network device with reference to FIG. 2.

FIG. 2 shows a schematic flowchart of a data transmission method 200 according to an embodiment of the present disclosure wherein, the method 200 may be performed by the network device. As shown in FIG. 2, the method 200 includes: in S210, a second downlink data packet is sent to a terminal device, the second downlink data packet including a second RQI that is a second preset value, the second preset value being used to indicate that the terminal device activates a first reflective QoS to update a first mapping relationship, and activates a second reflective QoS to update a second mapping relationship, the first mapping relationship being a mapping relationship from IP flows to QoS flows, the second mapping relationship being a mapping relationship from QoS flows to DRBs, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet.

As shown in FIG. 2, the method 200 further includes: in S220, the second uplink data packet sent by the terminal device is received.

As shown in FIG. 2, the method 200 further includes: in S230, a first downlink data packet and an RRC message are sent to the terminal device, after determining the first mapping relationship of the second uplink data packet is correct, the first downlink data packet including a first RQI that is a first preset value, the first preset value being used to indicate that the terminal device keeps an activation state of the first reflective QoS, the RRC message including a target mapping rule, and being used to indicate that the terminal device determines the mapping rule of the second mapping relationship as the target mapping rules.

Therefore, in the data transmission method of the embodiment of the present disclosure, the RQI and the RRC message sent by the network device to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

Optionally, after sending a first downlink data packet and an RRC message to the terminal device, the method further includes: receiving the first uplink data packet sent by the terminal device, the first mapping relationship of the first uplink data packet being determined by the terminal device according to the first reflective QoS, and the second mapping relationship of the first uplink data packet being determined by the terminal device according to the target rule.

Optionally, the target mapping rule is consistent with an updated mapping rule of the second mapping relationship.

It should be understood that the network device in the method 200 in the embodiment of the present disclosure may correspond to the network device in the method 100, and the terminal device in the method 200 may correspond to the terminal device in the method 100, and details are not described herein again.

Therefore, in the data transmission method of the embodiment of the present disclosure, the RQI and the RRC message sent by the network device to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

It should be understood that, in various embodiments of the present disclosure, the sequence numbers of the above processes do not mean the order of execution, and the execution order of the processes should be determined by their functions and internal logics, and should not constitute any limitation on the implementation processes of the embodiments of the present disclosure.

The data transmission method according to the embodiment of the present disclosure is described in detail above with reference to FIG. 1 to FIG. 2, and the terminal device and the network device according to the embodiment of the present disclosure will be described below with reference to FIG. 3 to FIG. 6.

Figure 3:
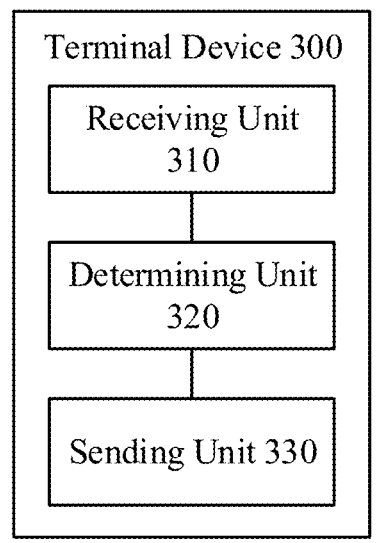
FIG. 3 is a schematic block diagram of a terminal device according to an embodiment of the present disclosure.

As shown in FIG. 3, the terminal device 300 according to the embodiment of the present disclosure includes: a receiving unit 310 and a determining unit 320. Optionally, the terminal device may further include a sending unit 330.

Specifically, the receiving unit 310 is configured to receive a first downlink data packet sent by a network device, the first downlink data packet including a first RQI that is a first preset value; the determining unit 320 is configured to keep a mapping rule of a first mapping relationship and a mapping rule of a second mapping relationship to be both unchanged, according to the first preset value, and receive an RRC message sent by the network device through the receiving unit 310, the first mapping relationship being a mapping relationship from IP flows to QoS flows, the second mapping relationship being a mapping relationship from QoS flows to DRBs, and the RRC message including a target mapping rule; and the determining unit 320 is further configured to: determine, according to the RRC message, the mapping rule of the second mapping relationship, as the target mapping rule.

Therefore, the terminal device in the embodiment of the present disclosure jointly determines whether the first mapping relationship and the second mapping relationship follow the reflective QoS by receiving the RQI and the RRC message sent by the network device, thereby flexibly configuring the mapping rule of the first mapping relationship and the mapping rule of the second mapping relationship, and making the states of the reflective QoS of the first mapping relationship and the second mapping relationship relatively independent.

Optionally, the receiving unit 310 is specifically configured to: receive a second downlink data packet sent by the network device, the second downlink data packet including a second RQI that is a second preset value before receiving a first RQI sent by a network device; the determining unit 320 is specifically configured to: according to the second preset value, activate a first reflective QoS to update the first mapping relationship, and activate a second reflective QoS to update the second mapping relationship, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; the sending unit 330 is configured to: send the second uplink data packet to the network device; the determining unit 320 is specifically configured to: keep an activation state of the first reflective QoS, and an activation state of the second reflective QoS.

Optionally, the determining unit 320 is specifically configured to: determine the first mapping relationship of the first downlink data packet as the first mapping relationship of a first uplink data packet according to the first reflective QoS, and determine the second mapping relationship of the first uplink data packet according to the target mapping rule, after the mapping rule of the second mapping relationship is determined as the target mapping rule according to the RRC message; the sending unit 330 is specifically configured to: send the first uplink data packet to the network device.

Optionally, the target mapping rule is consistent with an updated mapping rule of the second mapping relationship.

It should be understood that the terminal device 300 according to the embodiment of the present disclosure may correspond to the method 100 in the embodiment of the present disclosure, and the above and other operations and/or functions of the respective units in the terminal device 300 are respectively for realizing the corresponding flows of the terminal device in the respective methods in FIGS. 1 and 2, which are not described herein again for brevity.

Therefore, the terminal device in the embodiment of the present disclosure jointly determines whether the first mapping relationship and the second mapping relationship follow the reflective QoS by receiving the RQI and the RRC message sent by the network device, thereby flexibly configuring the mapping rule of the first mapping relationship and the mapping rule of the second mapping relationship, and making the states of the reflective QoS of the first mapping relationship and the second mapping relationship relatively independent.

Figure 4:
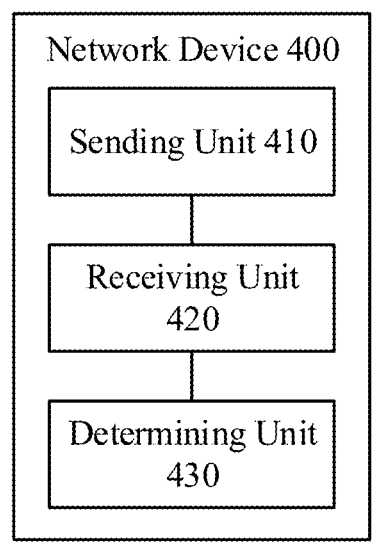
FIG. 4 is a schematic block diagram of a network device according to an embodiment of the present disclosure.

As shown in FIG. 4, the network device 400 according to an embodiment of the present disclosure includes: a sending unit 410, a receiving unit 420, and a determining unit 430.

Specifically, the sending unit 410 is configured to: send a second downlink data packet to a terminal device, the second downlink data packet including a second RQI that is a second preset value, the second preset value being used to indicate that the terminal device activates a first reflective QoS to update a first mapping relationship, and activates a second reflective QoS to update a second mapping relationship, the first mapping relationship being a mapping relationship from IP flows to QoS flows, the second mapping relationship being a mapping relationship from QoS flows to DRBs, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; the receiving unit 420 is configured to: receive the second uplink data packet sent by the terminal device; the determining unit 430 is configured to: send a first downlink data packet and an RRC message to the terminal device, after determining the first mapping relationship of the second uplink data packet is correct, the first downlink data packet including a first RQI that is a first preset value, the first preset value being used to indicate that the terminal device keeps an activation state of the first reflective QoS, the RRC message including a target mapping rule, and being used to indicate that the terminal device determines the mapping rule of the second mapping relationship as the target mapping rules.

Therefore, the RQI and the RRC message sent by the network device in the embodiment of the present disclosure to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

Optionally, the receiving unit 420 is specifically configured to: receive the first uplink data packet sent by the terminal device, the first mapping relationship of the first uplink data packet being determined by the terminal device according to the first reflective QoS, and the second mapping relationship of the first uplink data packet being determined by the terminal device according to the target rule, after the first downlink data packet and the RRC message are sent to the terminal device by the sending unit 410.

Optionally, the target mapping rule is consistent with an updated mapping rule of the second mapping relationship.

It should be understood that the network device 400 according to the embodiment of the present disclosure may correspond to the method 200 in the embodiment of the present disclosure, and the above and other operations and/or functions of the respective units in the network device 400 are respectively for realizing the corresponding flows of the network device in the respective methods in FIGS. 1 and 2, which are not described herein again for brevity.

Therefore, the RQI and the RRC message sent by the network device in the embodiment of the present disclosure to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

Figure 5:
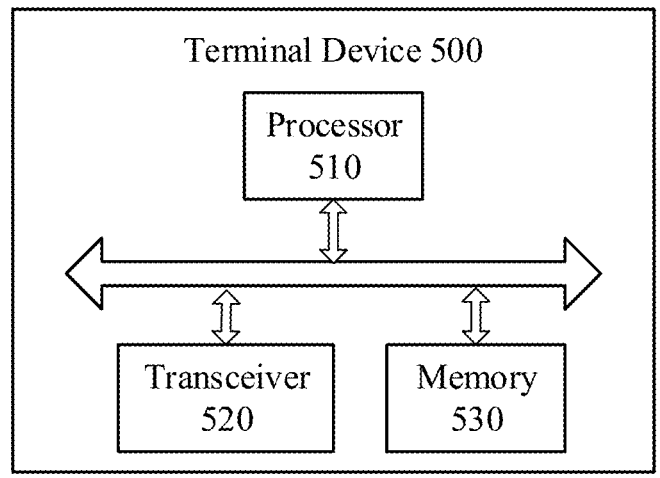
FIG. 5 is another schematic block diagram of a terminal device according to an embodiment of the present disclosure.

FIG. 5 shows a schematic block diagram of a terminal device 500 according to an embodiment of the present disclosure. As shown in FIG. 5, the terminal device 500 includes a processor 510 and a transceiver 520. The processor 510 is connected to the transceiver 520. Optionally, the terminal device 500 further includes a memory 530, and the memory 530 is connected to the processor 510. Wherein, the processor 510, the transceiver 520 and the memory 530 communicate with each other through an internal connection path, and transfer and/or control data signals. The memory 530 is configured to store instructions, and the processor 510 is configured to execute the instructions stored in the memory 530 to control the transceiver 520 to send signals or messages. The transceiver 520 is configured to receive a first downlink data packet sent by a network device, the first downlink data packet including a first RQI that is a first preset value; the processor 510 is configured to keep, according to the first preset value, a mapping rule of a first mapping relationship and a mapping rule of a second mapping relationship to be both unchanged, and receive an RRC message sent by the network device through the transceiver 520, the first mapping relationship being a mapping relationship from IP flows to QoS flows, the second mapping relationship being a mapping relationship from QoS flows to DRBs, and the RRC message including a target mapping rule; and the processor 510 is further configured to: determine, according to the RRC message, the mapping rule of the second mapping relationship, as the target mapping rule.

Therefore, the terminal device in the embodiment of the present disclosure jointly determines whether the first mapping relationship and the second mapping relationship follow the reflective QoS by receiving the RQI and the RRC message sent by the network device, thereby flexibly configuring the mapping rule of the first mapping relationship and the mapping rule of the second mapping relationship, and making the states of the reflective QoS of the first mapping relationship and the second mapping relationship relatively independent.

Optionally, the transceiver 520 is configured to: receive a second downlink data packet sent by the network device, the second downlink data packet including a second RQI that is a second preset value before receiving a first RQI sent by a network device; the processor 510 is configured to: according to the second preset value, activate a first reflective QoS to update the first mapping relationship, and activate a second reflective QoS to update the second mapping relationship, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; the transceiver 520 is configured to: send the second uplink data packet to the network device; the processor 510 is configured to: keep an activation state of the first reflective QoS, and an activation state of the second reflective QoS.

Optionally, the processor 510 is configured to: determine the first mapping relationship of the first downlink data packet as the first mapping relationship of a first uplink data packet according to the first reflective QoS, and determine the second mapping relationship of the first uplink data packet according to the target mapping rule, after the mapping rule of the second mapping relationship is determined as the target mapping rule according to the RRC message; the transceiver 520 is specifically configured to: send the first uplink data packet to the network device.

Optionally, the target mapping rule is consistent with an updated mapping rule of the second mapping relationship.

It should be understood that the terminal device 500 according to the embodiment of the present disclosure may correspond to the terminal device 300 in the embodiment of the present disclosure, and may correspond to implementing the corresponding body in the method 100 according to the embodiment of the present disclosure, and the above and other operations and/or functions of the respective units in the terminal device 500 are respectively for realizing the corresponding flows of the terminal device in the respective methods in FIGS. 1 and 2, which are not described herein again for brevity.

Therefore, the terminal device in the embodiment of the present disclosure jointly determines whether the first mapping relationship and the second mapping relationship follow the reflective QoS by receiving the RQI and the RRC message sent by the network device, thereby flexibly configuring the mapping rule of the first mapping relationship and the mapping rule of the second mapping relationship, and making the states of the reflective QoS of the first mapping relationship and the second mapping relationship relatively independent.

Figure 6:
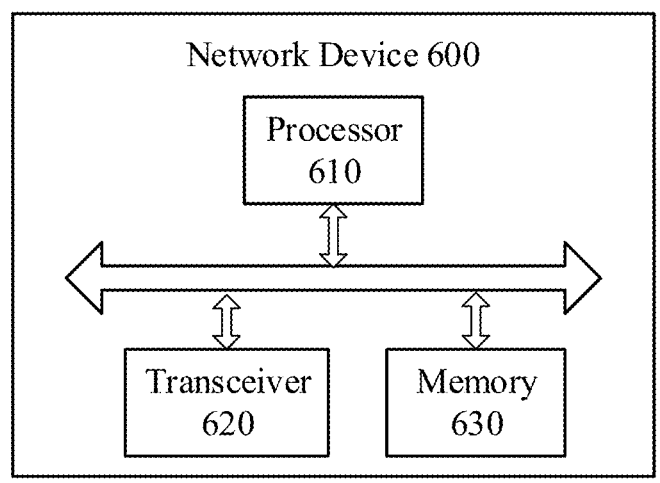
FIG. 6 is another schematic block diagram of a network device according to an embodiment of the present disclosure.

FIG. 6 shows a schematic block diagram of a network device 600 according to an embodiment of the present disclosure. As shown in FIG. 6, the network device 600 includes a processor 610 and a transceiver 620. The processor 610 is connected to the transceiver 620. Optionally, the terminal device 600 further includes a memory 630, and the memory 630 is connected to the processor 610. Wherein, the processor 610, the transceiver 620 and the memory 630 communicate with each other through an internal connection path, and transfer and/or control data signals. The memory 630 stores instructions, and the processor 610 is configured to execute the instructions stored in the memory 630 to control the transceiver 620 to send signals or messages. The transceiver 620 is configured to send a second downlink data packet to a terminal device, the second downlink data packet including a second RQI that is a second preset value, the second preset value being used to indicate that the terminal device activates a first reflective QoS to update a first mapping relationship, and activates a second reflective QoS to update a second mapping relationship, the first mapping relationship being a mapping relationship from IP flows to QoS flows, the second mapping relationship being a mapping relationship from QoS flows to DRBs, the updating the first mapping relationship including determining the first mapping relationship of the second downlink data packet as the first mapping relationship of a second uplink data packet, and the updating the second mapping relationship including determining the second mapping relationship of the second downlink data packet as the second mapping relationship of the second uplink data packet; the transceiver 620 is configured to: receive the second uplink data packet sent by the terminal device; the processor 610 is configured to: send a first downlink data packet and an RRC message to the terminal device, after determining the first mapping relationship of the second uplink data packet is correct, the first downlink data packet including a first RQI that is a first preset value, the first preset value being used to indicate that the terminal device keeps an activation state of the first reflective QoS, the RRC message including a target mapping rule, and being used to indicate that the terminal device determines the mapping rule of the second mapping relationship as the target mapping rules.

Therefore, the RQI and the RRC message sent by the network device in the embodiment of the present disclosure to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

Optionally, the transceiver 620 is configured to: receive the first uplink data packet sent by the terminal device, the first mapping relationship of the first uplink data packet being determined by the terminal device according to the first reflective QoS, and the second mapping relationship of the first uplink data packet being determined by the terminal device according to the target rule, after the first downlink data packet and the RRC message are sent to the terminal device.

Optionally, the target mapping rule is consistent with an updated mapping rule of the second mapping relationship.

It should be understood that the network device 600 according to the embodiment of the present disclosure may correspond to the network device 400 in the embodiment of the present disclosure, and may correspond to implementing the corresponding body in the method 200 according to the embodiment of the present disclosure, and the above and other operations and/or functions of the respective units in the network device 600 are respectively for realizing the corresponding flows of the network device in the respective methods in FIGS. 1 and 2, which are not described herein again for brevity.

Therefore, the RQI and the RRC message sent by the network device in the embodiment of the present disclosure to the terminal device may indicate whether the first mapping relationship and the second mapping relationship of the terminal device respectively follow the reflective QoS, thereby flexibly configuring the mapping rule of the first mapping relationship and the mapping rule of the second mapping relationship, and making the states of the reflective QoS of the first mapping relationship and the second mapping relationship relatively independent.

It should be noted that the above method embodiments of the present disclosure may be applied to a processor or implemented by a processor. The processor may be an integrated circuit chip with signal processing capabilities. In the implementation process, each step of the foregoing method embodiment may be completed by an integrated logic circuit of hardware in the processor or an instruction in a form of software. The above processor may be general purpose processors, digital signal processors (DSPs), application specific integrated circuits (ASICs), field programmable gate arrays (FPGAs) or other programmable logic devices, discrete gates or transistor logic devices, discrete hardware components, etc., which can implement or execute the methods, steps, and logic blocks disclosed in the embodiments of the present disclosure. The general purpose processor may be a microprocessor can also be any conventional processor, etc. The steps of the methods disclosed in the embodiments of the present disclosure may be directly implemented by the hardware decoding processor, or may be performed by a combination of hardware and software modules in the decoding processor. The software modules can be located in a conventional storage medium such as a random access memory, a flash memory, a read only memory, a programmable read only memory or an electrically erasable programmable memory, and a register. The storage medium is located in the memory, and the processor reads the information in the memory and completes the steps of the above methods with its hardware.

It is to be understood that the memory in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (EPROM), or an electrically EPROM (EEPROM) or flash memory. The volatile memory can be a random access memory (RAM) that acts as an external cache. By way of example and not limitation, many forms of RAM are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a synchlink DRAM (SLDRAM)) and a direct rambus RAM (DR RAM). It should be noted that the memory of the system and method described herein are intended to include, without being limited to, these and any other suitable types of memory.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered to beyond the scope of the present disclosure.

It may be clearly understood by those skilled in the art that details of specific operation procedures of the systems, devices and units can be found in the corresponding process in the foregoing method embodiment, and details are not described herein again.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one monitoring unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes any medium that is capable of storing program codes such as a USB disk, a mobile hard disk, a Read-Only Memory (ROM), a Random Access Memory (RAM), a magnetic disk or an optical disk.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A data transmission method, comprising:
receiving a first downlink data packet sent by a network device, the first downlink data packet comprising a first reflective QoS indication RQI that is a first preset value;
keeping, according to the first preset value, a mapping rule of a first mapping relationship and a mapping rule of a second mapping relationship to be both unchanged, and receiving an radio resource control RRC message sent by the network device, the first mapping relationship being a mapping relationship from internet protocol IP flows to quality of service QoS flows, the second mapping relationship being a mapping relationship from QoS flows to data radio bearers DRBs, and the RRC message comprising a target mapping rule; and
determining, according to the RRC message, the mapping rule of the second mapping relationship, as the target mapping rule,
wherein before receiving the first RQI sent by the network device, the method further comprises:
receiving a second downlink data packet sent by the network device, the second downlink data packet comprising a second RQI that is a second preset value;
activating, according to the second preset value, a first reflective QoS to update the first mapping relationship, and activating, according to the second preset value, a second reflective QoS to update the second mapping relationship, the updating the first mapping relationship comprising determining the first mapping relationship of the second downlink data packet as the first mapping relationship of a second uplink data packet, and the updating the second mapping relationship comprising determining the second mapping relationship of the second downlink data packet as the second mapping relationship of the second uplink data packet; and
sending the second uplink data packet to the network device;
wherein keeping, according to the first preset value, the mapping rule of the first mapping relationship and the mapping rule of the second mapping relationship to be both unchanged comprises:
keeping an activation state of the first reflective QoS, and an activation state of the second reflective QoS.

2. The method according to claim 1, wherein after determining, according to the RRC message, the mapping rule of the second mapping relationship, as the target mapping rule, the method further comprises
determining the first mapping relationship of the first downlink data packet as the first mapping relationship of a first uplink data packet according to the first reflective QoS, and determining the second mapping relationship of the first uplink data packet according to the target mapping rule; and sending the first uplink data packet to the network device.

3. The method according to claim 1, wherein the target mapping rule is consistent with an updated mapping rule of the second mapping relationship.

4. A data transmission method, comprising:
sending a second downlink data packet to a terminal device, the second downlink data packet comprising a second reflective QoS indication RQI that is a second preset value, the second preset value being used to indicate the terminal device to activate a first reflective QoS to update a first mapping relationship, and activate a second reflective QoS to update a second mapping relationship, the first mapping relationship being a mapping relationship from interne protocol IP flows to quality of service QoS flows, the second mapping relationship being a mapping relationship from QoS flows to data radio bearers DRBs, the updating the first mapping relationship comprising determining the first mapping relationship of the second downlink data packet as the first mapping relationship of a second uplink data packet, and the updating the second mapping relationship comprising determining the second mapping relationship of the second downlink data packet as the second mapping relationship of the second uplink data packet;
receiving the second uplink data packet sent by the terminal device; and
sending a first downlink data packet and an radio resource control RRC message to the terminal device, after determining the first mapping relationship of the second uplink data packet is correct, the first downlink data packet comprising a first RQI that is a first preset value, the first preset value being used to indicate that the terminal device keeps an activation state of the first reflective QoS, the RRC message comprising a target mapping rule, and the target mapping rule being used to indicate the terminal device to determine the mapping rule of the second mapping relationship as the target mapping rules.

5. The method according to claim 4, after sending the first downlink data packet and the radio resource control RRC message to the terminal device, the method further comprises:
receiving the first uplink data packet sent by the terminal device, the first mapping relationship of the first uplink data packet being determined by the terminal device according to the first reflective QoS, and the second mapping relationship of the first uplink data packet being determined by the terminal device according to the target rule.

6. The method according to claim 4, wherein the target mapping rule is consistent with an updated mapping rule of the second mapping relationship.

7. A network device, comprising a processor, a transceiver and a memory, wherein when instructions stored in the memory is executed by the processor, the execution causes the network device to perform the method according to claim 4.

8. The network device according to claim 7, wherein the transceiver is specifically configured to:
receive the first uplink data packet sent by the terminal device, the first mapping relationship of the first uplink data packet being determined by the terminal device according to the first reflective QoS, and the second mapping relationship of the first uplink data packet being determined by the terminal device according to the target rule, after the first downlink data packet and the radio resource control RRC message are sent to the terminal device by a sending unit.

9. The network device according to claim 7, wherein the target mapping rule is consistent with an updated mapping rule of the second mapping relationship.

10. A terminal device, comprising a processor, a transceiver and a memory, wherein when instructions stored in the memory is executed by the processor, the execution causes the terminal device to:
receive, by the transceiver, a first downlink data packet sent by a network device, the first downlink data packet comprising a first reflective QoS indication RQI that is a first preset value; and
keep, by the processor, according to the first preset value, a mapping rule of a first mapping relationship and a mapping rule of a second mapping relationship to be both unchanged, and receiving an radio resource control RRC message sent by the network device, the first mapping relationship being a mapping relationship from internet protocol IP flows to quality of service QoS flows, the second mapping relationship being a mapping relationship from QoS flows to data radio bearers DRBs, and the RRC message comprising a target mapping rule,
determine, by the processor, according to the RRC message, the mapping rule of the second mapping relationship, as the target mapping rule,
wherein the transceiver is specifically configured to:
receive a second downlink data packet sent by the network device, the second downlink data packet comprising a second RQI that is a second preset value before receiving a first RQI sent by a network device;
wherein the processor is specifically configured to:
activate, according to the second preset value, a first reflective QoS to update the first mapping relationship, and activate, according to the second preset value, a second reflective QoS to update the second mapping relationship, the updating the first mapping relationship comprising determining the first mapping relationship of the second downlink data packet as the first mapping relationship of a second uplink data packet, and the updating the second mapping relationship comprising determining the second mapping relationship of the second downlink data packet as the second mapping relationship of the second uplink data packet;
wherein the terminal device is further caused to:
send, by the transceiver, the second uplink data packet to the network device;
wherein the processor is specifically configured to:
keep an activation state of the first reflective QoS, and an activation state of the second reflective QoS.

11. The terminal device according to claim 10, wherein the processor is specifically configured to:
determine the first mapping relationship of the first downlink data packet as the first mapping relationship of a first uplink data packet according to the first reflective QoS, and determine the second mapping relationship of the first uplink data packet according to the target mapping rule, after the mapping rule of the second mapping relationship is determined as the target mapping rule according to the RRC message;
the transceiver is specifically configured to:
send the first uplink data packet to the network device.

12. The terminal device according to claim 10, wherein the target mapping rule is consistent with an updated mapping rule of the second mapping relationship.

* * * * *